United States Patent
Nomura et al.

[11] Patent Number: 6,130,788
[45] Date of Patent: Oct. 10, 2000

[54] STRUCTURE FOR HOLDING LENS

[75] Inventors: Hiroshi Nomura, Saitama; Kazunori Ishizuka, Kanagawa, both of Japan

[73] Assignee: Asahi Kogaku Kogyo Kabushiki Kaisha, Tokyo, Japan

[21] Appl. No.: 09/469,359

[22] Filed: Dec. 22, 1999

[30] Foreign Application Priority Data

Dec. 25, 1998 [JP] Japan ................... 10-369424

[51] Int. Cl.[7] .................................................. G02B 15/14
[52] U.S. Cl. ............................................. 359/694; 359/703
[58] Field of Search .................................. 359/694, 703, 359/704, 819, 822

[56] References Cited

U.S. PATENT DOCUMENTS

| | | | |
|---|---|---|---|
| 4,525,041 | 6/1985 | Andrews | 451/42 |
| 5,555,480 | 9/1996 | Tanaka et al. | 359/822 |
| 5,642,235 | 6/1997 | Ichikawa | 359/811 |
| 5,754,350 | 5/1998 | Sato | 359/818 |
| 5,956,188 | 9/1999 | Lee | 359/822 |
| 5,986,827 | 11/1999 | Hale | 359/822 |

*Primary Examiner*—Ricky Mack
*Attorney, Agent, or Firm*—Greenblum & Bernstein, P.L.C.

[57] ABSTRACT

A structure which holds a lens by fitting a lens holding member holding a lens into an outer cylindrical member. In the structure, a biasing mechanism is provided to bias the lens holding member, located within the outer cylindrical member, forward or backward in an optical axis direction. A plurality of engaging nails are arranged on one of circumferential surfaces of the lens holding member and the outer cylindrical member at substantially equal angular intervals circumferentially. A plurality of fixing holes arranged on the other of the circumferential surfaces of the lens holding member and the outer cylindrical member at substantially equal angular intervals circumferentially to be respectively engaged with the engaging nails to retain the lens holding member relative to the outer cylindrical member against a biasing force of the biasing mechanism. A tilt correcting plate is selectively mountable between one of the engaging nails and mating one of the fixing hole to tilt an axis of the lens holding member relative to an axis of the outer cylindrical member.

10 Claims, 2 Drawing Sheets

STRUCTURE FOR HOLDING LENS

BACKGROUND OF THE INVENTION

The present invention relates to a holding structure for a lens, capable of correcting a tilt of a lens group.

When a member for holding a lens group (such as an AF/AE shutter unit for holding an AF lens group) is held in a cylindrical member, the lenses are conventionally fixed by a bayonet attachment or a screw.

The fixing structure using a screw can correct a tilt of a lens group by adding a tilt correction washer onto the screwed portion. This tilt correction requires the cumbersome steps of detaching the screw, inserting the washer and again attaching the screw. Further, space efficiency (utility) for the inside of the barrel is poor.

SUMMARY OF THE INVENTION

Accordingly, an object of the invention is to provide a structure for holding a lens that is capable of correcting a tilt of a lens group easily with a good space efficiency and a simple configuration.

In a structure for holding a lens of the invention, a tilt correcting plate is selectively mountable between a fixing hole and a mating engaging nail to tilt an axis of a lens holding member relative to an axis of an outer cylindrical member. Therefore, a tilt of a lens group can be corrected easily with good space efficiency and a simple configuration.

The structure for holding a lens according to an embodiment of the invention is arranged to fit a lens holding member holding a lens into an outer cylindrical member, and includes:

- a biasing mechanism, located within the outer cylindrical member, which biases the lens holding member, forward or backward in an optical axis direction;
- a plurality of engaging nails arranged on one of circumferential surfaces of the lens holding member and the outer cylindrical member at substantially equal angular intervals circumferentially
- a plurality of fixing holes arranged on the other of the circumferential surfaces of the lens holding member and the outer cylindrical member at substantially equal angular intervals circumferentially to be respectively engaged with the engaging nails to retain the lens holding member relative to the outer cylindrical member against a biasing force of the biasing mechanism; and
- at least one tilt correcting plate selectively mountable between one of the engaging nails and mating one of the fixing hole to tilt an axis of the lens holding member relative to an axis of the outer cylindrical member.

The present disclosure relates to the subject matter contained in Japanese patent application No. Hei. 10-369424 (filed on Dec. 25, 1998), which is expressly incorporated herein by reference in its entirety.

DESCRIPTION OF THE PREFERRED EMBODIMENT

Hereinafter, an embodiment of the invention will be described with reference to the accompanying drawings.

Figure 1:
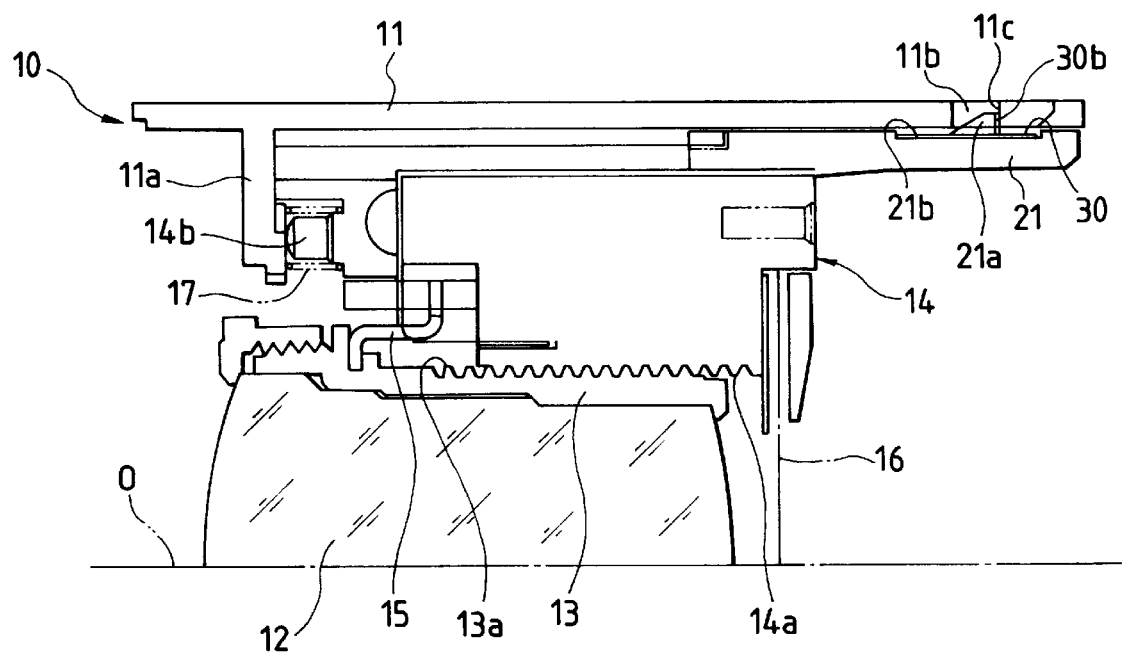
FIG. 1 is a cross-sectional view showing the upper half of a lens barrel with respect to an optical axis according to the invention.

FIG. 1 is a cross-sectional view showing the upper half of a lens barrel 10 with respect to optical axis O, to which the invention is applied The lens barrel 10 is provided in a lens shutter camera, which has a barrel (outer cylindrical member) 11 and an AF/AE shutter unit (lens holding member) 14 supported within the barrel 11. A shutter 16 having a plurality of shutter vanes is provided to the right of (i.e., behind) the AF/AE shutter unit 14, when viewed in FIG. 1.

A female helicoid 14a is formed on the inner circumferential surface of the AF/AE shutter unit 14, and is threadingly engaged with a male helicoid 13a that is formed on the outer circumferential surface of a lens frame 13 supporting an AF lens group 12. The rotation of the lens frame 13 relative to the AE/AE shutter unit 14 causes the movement of the AF lens group 12 along the optical axis O by the action of the male helicoid 13a and the female helicoid 14a.

The AF/AE shutter unit 14 is provided with a drive pin 15 that is engaged with the lens frame 13 to rotatingly drive the lens frame 13. The AF/AE shutter unit 14 drives the drive pin 15 by an amount corresponding to the object distance so as to rotate the lens frame 13, thereby moving the AF lens group 12 to provide a focussed state.

Three elastic legs 21, extending to the right (i.e., rearwardly) in the optical axis direction when viewed in FIG. 1, and having elasticity in the radial direction, are formed integrally on the outer circumference rear part of the AF/AE shutter unit 14. These elastic legs 21 are arranged at substantially equal angular intervals (i.e., about 120 degree intervals) circumferentially. An engaging nail 21a is provided on each elastic leg 21, protruding outward in the radial direction. The engaging nail 21a has a tapered shape such that the protruding amount of a part of the engaging nail 21a from the outer circumferential surface of the elastic leg 21 is smaller as the part of the engaging nail 21a reaches more forward in the optical axis direction. A receptacle surface 21b is formed on the elastic leg 21 to circumscribe or surround the engaging nails 21a. The receptacle surface 21b is adapted to receive a tilt correcting plate 30 (see FIG. 3). The receptacle surface 21b is recessed radially inward by a predetermined depth from the outer circumferential surface of the elastic legs 21. The depth of the recessed receptacle surface 21b is set to be slightly larger than the thickness of the tilt correcting plate 30. Further, three coil spring supporting projections 14b extend forward in the optical axis direction from the front end part of the AF/AE shutter unit 14 so as to circumferentially correspond to the three elastic legs 21, respectively.

A flange part 11a is formed in the vicinity of the front end part of the barrel 11, which extends radially inward therefrom. Each coil spring supporting projection 14b faces the flange part 11a in the optical axis direction. A coil spring (i.e., a compression spring) 17 is interposed between the flange part 11a and each coil spring supporting projection 14b in the compressed state.

Three fixing holes 11b are formed proximate the rear end part of the barrel 11, and are arranged at substantially equal angular intervals circumferentially. The three engaging nails 21a are engaged with the three fixing holes 11b, respectively. The length of each fixing hole 11b in the optical axis direction is set to be slightly longer than the length of the corresponding engaging nail 21a in the optical axis direction. To support the AF/AE shutter unit 14 by the barrel 11, the AF/AE shutter unit 14 is inserted into the barrel 11 with the coil springs 17 fitted on a respective coil spring supporting projection 14b until the engaging nails 21a are inserted into and engaged with the respective fixing hole 11b. In this supported state, the AF/AE -shutter unit 14 is slightly movable forward in the optical axis direction relative to the barrel 11 against the biasing force of the coil springs 17. When the coil spring 17 is not provided on each coil spring supporting projection 14b, a slight clearance is formed between the barrel 11 and the AF/AE shutter unit 14 in the optical axis direction. However, in this embodiment, since the coil springs 17 always bias the AF/AE shutter unit 14 relative to the barrel 11 backward in the optical axis direction, clearance is not provided.

Figure 3:
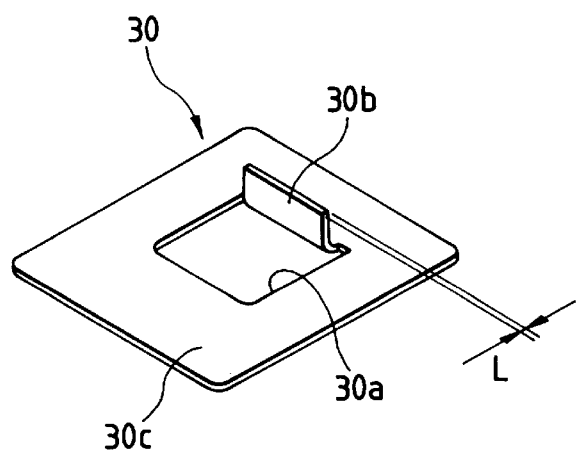
FIG. 3 is a perspective external appearance of a tilt correcting washer.
Figure 2:
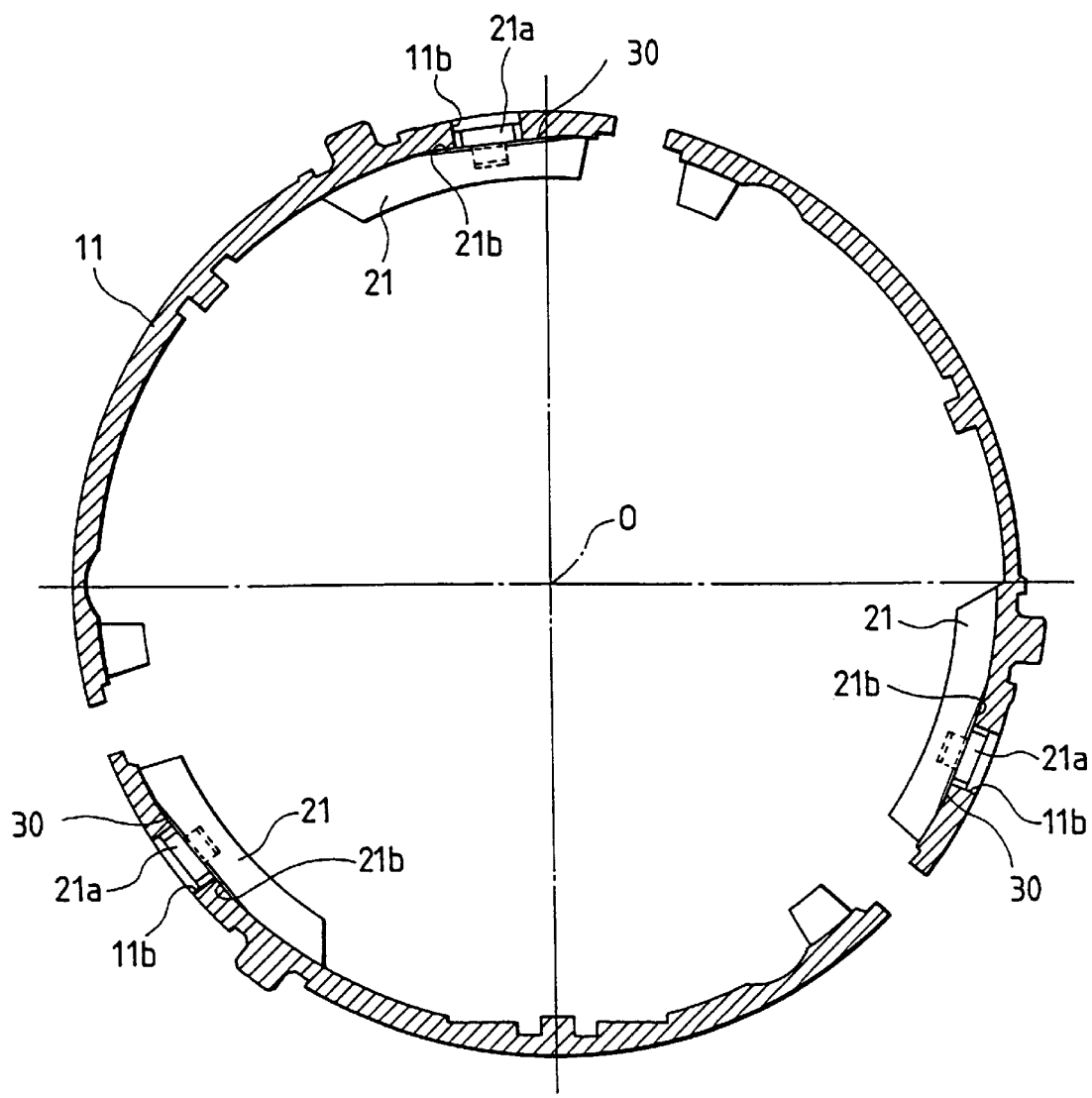
FIG. 2 is a cross-sectional view of the lens barrel of FIG. 1 showing the essential part of the invention.

If a tilt of the AF lens group 12 is caused where the AF/AE shutter unit 14 is fitted in the barrel 11, the tilt is corrected by mounting the tilt correcting plate 30 onto the receptacle surface 21b of the elastic leg 21 that is selected to cancel the tilt. That is, the tilt can be corrected by interposing the tilt correcting plate 30 between the engaging nail 21a and the mating fixing hole 11b. As shown in FIG. 3, the tilt correcting plate 30 is in the form of a substantially regular square shape with a substantially regular square hole 30a passing through substantially the central part thereof. The tilting correcting plate 30 has a first planar part 30c, and an elongating, second planar part 30b, which extends from one side of the hole 30a by a predetermined length in a direction substantially perpendicular to the first planar part 30c. The elongating part 30b is formed, for instance, by bending a part of the first planar part 30c of the tilting correcting plate 30 by approximately 90 degrees. The tilt correcting plate 30 having such a shape is set on the receptacle surface 21b, such that the engaging nail 21a passes through the hole 30a and the elongating part 30b is interposed between the engaging nail 21a and the rear side wall surface 11c of the fixing hole 11b as shown in FIG. 1. The elongating part 30b is always pressed against the rear side wall surface 11c of the fixing hole 11b through the engaging nail 21a by the biasing force of the coil spring 17.

When the tilt correcting plate 30 is mounted on a selected receptacle surface 21b of an elastic leg 21, and the engaging nails 21a are engaged with the fixing holes 11b, the selected receptacle surface 21b, i.e., the selected elastic leg 21, is shifted forward in the optical axis direction relative to the barrel 11 by an amount corresponding to the thickness L (see FIG. 3) of the elongating part 30b, since the elongating part 30b of the tilt correcting plate 30 is disposed between the engaging nail 21a and the rear side wall surface 11c of the fixing hole 11b. Accordingly, the axis of the AF/AE shutter unit 14 is tilted relative to the axis of the barrel 11 depending on the shift amount, and thus the AF lens group 12 is tilted relative to the optical axis O.

A plurality of the tilt correcting plates 30 are preliminarily prepared, each having an elongating part 30b of a different thickness, so that an appropriate tilt correcting plate 30 can be selected and used depending on the tilt amount of the AF lens group 12 to be corrected.

The structure for holding a lens according to the present invention has the following advantages: If a tilt is generated in the AF lens group 12 in the state where the AF/AE shutter unit 14 is fitted in the barrel 11, the tilt can be corrected easily by simply selecting a tilt correcting plate 30 corresponding to the tilt amount and mounting the tilt correcting plate 30 onto a receptacle surface 21b of an elastic leg 21 selected to cancel the tilt. Since screwing is not required in mounting the tilt correcting plate 30, the tilt correction may be easily and quickly performed. Furthermore, since the tilt correcting plate 30 is held between the barrel 11 and the elastic leg 21, space efficiency is good.

Although the three elastic legs 21 are formed in the AF/AE shutter unit 14 at substantially equal angular intervals in the circumferential direction, the invention is not limited thereto, and four or more elastic legs 21 can be formed at substantially equal angular intervals in the circumferential direction. In this case, an engaging nail 21a is provided on each elastic leg 21, and further, fixing holes 11b of the number the same as that of the engaging nails 21a are formed at substantially equal angular intervals in the circumferential direction proximate the rear end part of the barrel 11.

Moreover, although in this embodiment the engaging nails 21a are provided in the elastic legs 21 side whereas the fixing holes 11b are provided in the barrel 11 side, it is also possible to provide the fixing holes in the elastic legs 21 side and provide the engaging nails in the barrel 11 side.

Furthermore, although the coil spring 17 is used as an elastic member for always or constantly biasing the AF/AE shutter unit 14 backward in the optical axis direction in this embodiment, other elastomeric members, such as a plate spring having the function same as that of the coil spring 17, can be used in place of the coil spring 17.

What is claimed is:

1. A structure for holding a lens, the structure fitting a lens holding member holding a lens in an outer cylindrical member, the structure comprising:

a biasing mechanism, located within the outer cylindrical member, adapted to bias the lens holding member, at least one of forward and backward in an optical axis direction;

a plurality of engaging nails arranged on one of circumferential surfaces of the lens holding member and the outer cylindrical member, at substantially equal angular intervals circumferentially;

a plurality of fixing holes arranged on the other of the circumferential surfaces of the lens holding member and the outer cylindrical member, at substantially equal angular intervals circumferentially to be respectively engaged with the engaging nails to retain the lens holding member relative to the outer cylindrical member against a biasing force of the biasing mechanism; and at least one tilt correcting plate selectively mountable between one of the engaging nails and mating one of the fixing hole to tilt an axis of the lens holding member relative to an axis of the outer cylindrical member.

2. The structure for holding a lens according to claim 1, wherein each of the substantially equal angular intervals is about 120 degrees.

3. The structure for holding a lens according to claim 1, wherein the biasing mechanism includes an elastic member located between the cylindrical member and the lens holding member.

4. The structure for holding a lens according to claim 3, wherein the elastic member is a compression spring adapted to be compressed between the cylindrical member and the lens holding member.

5. The structure for holding a lens according to claim 1, further comprising:

a plurality of elastic legs having elasticity in a radial direction and extending in the optical axis direction, the elastic legs being arranged on the lens holding member at substantially equal angular intervals circumferentially, each of the elastic legs provided with a corresponding one of the engaging nails.

6. The structure for holding a lens according to claim 1, wherein the tilt correcting plate includes a first planar part having an opening through which the tilt correcting plate is mountable to the engaging nail, and a second planar part substantially perpendicular to the first planar part and located between the engaging nail and the mating fixing hole when the engaging nail is engaged with the mating fixing hole.

7. The structure for holding a lens according to claim 6, wherein a recessed part is formed around the engaging nail to receive the first planar part.

8. The structure for holding a lens according to claim 7, wherein a depth of the recessed part is larger than a thickness of the first planar part.

9. The structure for holding a lens according to claim 1, wherein the tilt correcting plate is adapted to shift the engaging nail relative to the mating fixing hole in the optical axis direction against a biasing force of the biasing mechanism when the tilt correcting plate is mounted between the engaging nail and the mating fixing hole.

10. The structure for holding a lens according to claim 1, wherein a plurality of the tilt correcting plates are provided, each having a respective, different thickness from each other.

* * * * *